July 1, 1941.     A. WRIGHT     2,247,460
CONTINUOUS FILTRATION
Filed Nov. 30, 1937     6 Sheets-Sheet 1

Inventor
Arthur Wright
By W. E. Sherwood
Attorney

July 1, 1941.  A. WRIGHT  2,247,460
CONTINUOUS FILTRATION
Filed Nov. 30, 1937   6 Sheets-Sheet 3

Inventor
Arthur Wright
By
W E Sherwood
Attorney

Patented July 1, 1941

2,247,460

UNITED STATES PATENT OFFICE 2,247,460

CONTINUOUS FILTRATION

Arthur Wright, Louisville, Ky.

Application November 30, 1937, Serial No. 177,285

10 Claims. (Cl. 210—199)

This invention relates to the art of filtration in which solids in suspension are to be separated from a liquid vehicle. In many classes of industrial filtration numerous attempts have been made to employ and to take advantage of the inherent values of continuous filtering processes. These advantages, however, are frequently not obtained by reason of limitations found in the apparatus employed; or due to complexity and unreliability in the process steps; or by reason of lack of standardization in manufacture of equipment suitable for more than one use or set of conditions.

The present invention provides a solution to many of these problems in the art of continuous filtration, particularly in fields such as the filtration of chemicals or food products wherein special filtering problems are encountered. As the disclosure proceeds, however, it will become evident that the invention is limited in no way to any one usage or to any one type of product. While employing the continuous filtration principle found in certain known rotary type vacuum filters, the invention teaches a basically new filtering process and discloses a new type of filter apparatus adapted to be constructed, installed and used in accordance with standard unit teachings found in other arts. For example, it has been customary in the past to design, build, install and use a separate heavy filter apparatus for a given use or set of conditions with the result that the apparatus frequently is of no value for any other use or product wherein different filtering conditions exist. Moreover, little progress has been made toward standardization of the construction of such apparatus by fabrication from standard parts.

This invention therefore has as one object the provision of a self-contained filter apparatus which may be manufactured as a standard unit for use solely or jointly with other similar units in a continuous filtration process and which may be employed without material change in the filtering of products other than those for which it was originally intended.

In order to achieve this objective the invention has as other objects the provision of a simple, light weight rotary drum having sectional filter compartments with improved packing means therebetween and adapted to cooperate with a continuous filter medium passing over said drum in cooperative filtering relation without fixed connection thereto. A further object is the provision of a new means for supporting the filter medium while out of contact with the filter drum and which may also be constructed upon unit principles.

As a main object the invention teaches a new method of continuous filtration in which a more uniform and efficient separation of solids and liquid may be effected and which may be carried out rapidly without slowly down the speed of rotation of the filter drum in order to insure the formation of a thick filter cake thereon as has been the practice heretofore. In order to achieve this objective the invention has as further objects the provision of a new and improved filter medium comprising a plurality of cooperating layers of filter elements adapted to remove the filter cake in a continuous and efficient manner without breakage and with any desired degree of thickness.

Other objects include the removal of one or more grades of filtrate and the ability to filter efficiently at widely varying levels of submergence.

As a further object, the invention provides a new and improved type of filter medium layer comprising a single endless cord in contrast to prior practices wherein a plurality of such endless cords were required to form a filter medium layer. In order to achieve this objective the invention has as further objects the provision of a plurality of such filter medium layers passing into and out of a filtering relation upon the supporting drum and adapted to be seated in superimposed relation to each other to form a filter medium suitable for efficient and uniform filtering and adapted for continual and adequate cleaning.

Other objects relate to the provision of means for guiding the endless cords forming the layers of the filter medium; for continually transposing the relative lateral positions of the portions of the cords upon the filter drum and for washing the cords when occasion demands.

Other objects pertain to the teaching of a novel method of filtering liquids through a filter medium having a reduced superficial drainage surface whereby the solids may be caused to form a rapidly deposited filter cake and thus permit the removal of thin cakes as well as thick cakes. Other objects include filter apparatus having a reduced volume in drainage with a consequent reduced demand on vacuum producing sources and having the characteristic of rapidly building up a filter cake.

Other objects include an apparatus which may be easily fabricated from light weight inexpensive materials and which may be readily cleaned due to accessibility of operative filter parts.

Many other objects and advantages will occur to those skilled in the art when considered in conjunction with the following description and the accompanying drawings in which.

Figure 1:
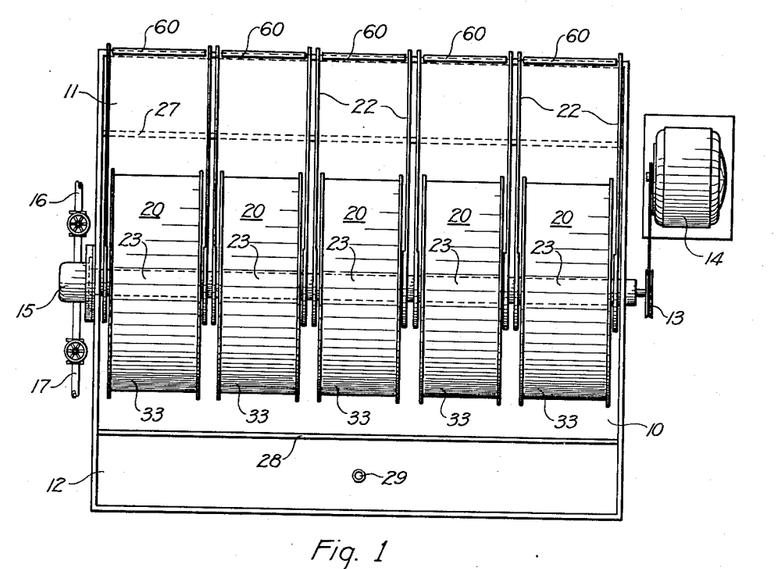
Figure 1 is a view showing an assembly comprising a plurality of standard filter units with the filter medium removed for purposes of clarity.

The filter assembly shown in Figure 1 illustrates but one of the many different arrangements made possible by reason of the unit construction principle taught by the present invention. As shown therein a large filter tank 10 contains the filterable material and may have an inlet tank section 11 and an overflow tank section 12. Mounted within the tank is a plurality of rotary filter units 20, shown in general outline, each of which is substantially self contained and is so constructed as to be capable of use singly or jointly in cooperation with other units. When used jointly as herein shown each unit will be mounted upon its own axle 23 and these axles when joined together by any conventional means will be adapted to be driven as a single shaft by any suitable source of power such as pulley 13 driven from a motor 14. Likewise when used jointly in this arrangement the axles 23 of each unit will be mounted in the manner later to be disclosed so that a single outlet valve 15 having vacuum drainage means indicated generally at 16 and 17 will function to remove the liquid filtrate from the entire filter assembly. It is contemplated that all portions of the tank 10 will form an open space for the bath of material to be filtered and that a greater or a smaller number of the filter units 20 will be used depending upon the required capacity of the filtering apparatus. Each filter unit is adapted to contain its own filtering medium (which for convenience is omitted from Figure 1) mounted upon its own rotary drum 33 and upon its own spaced supports 22. This self-contained structure consequently is capable of usage alone upon being provided with a source of power for rotating the unit within the bath and with a source of vacuum drainage for removing the filtrate separated from the solids contained in the material undergoing filtration.

Figure 2:
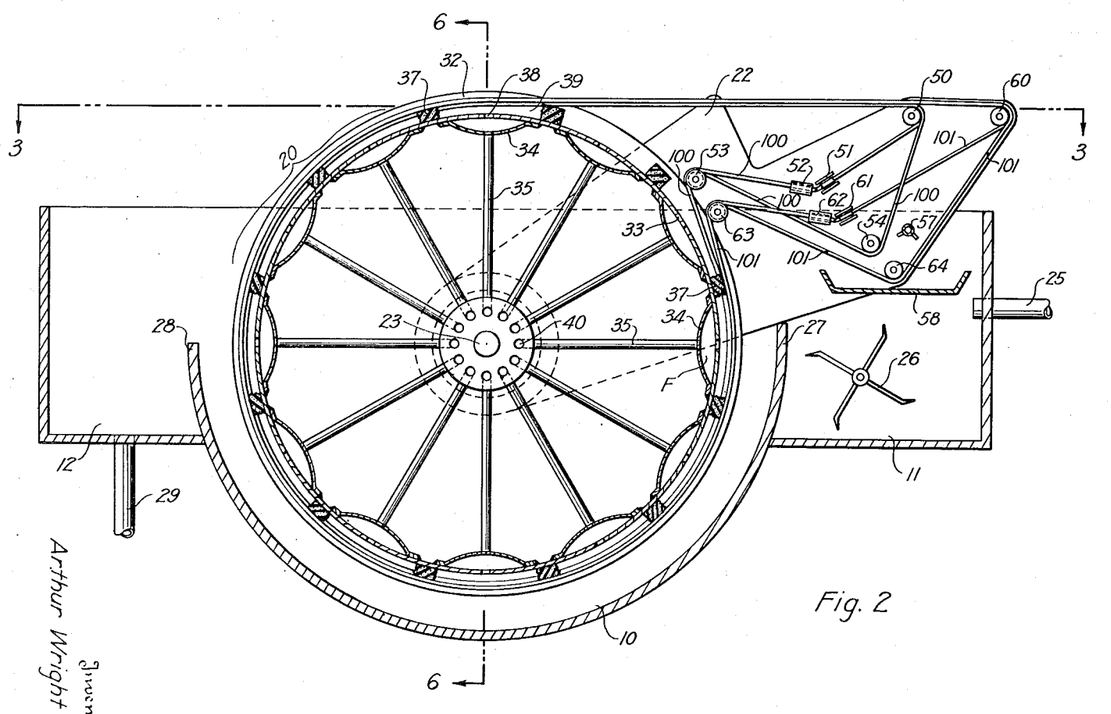
Figure 2 is a sectional view taken on line 2—2 of Figure 3.
Figures 3, 13, 14:
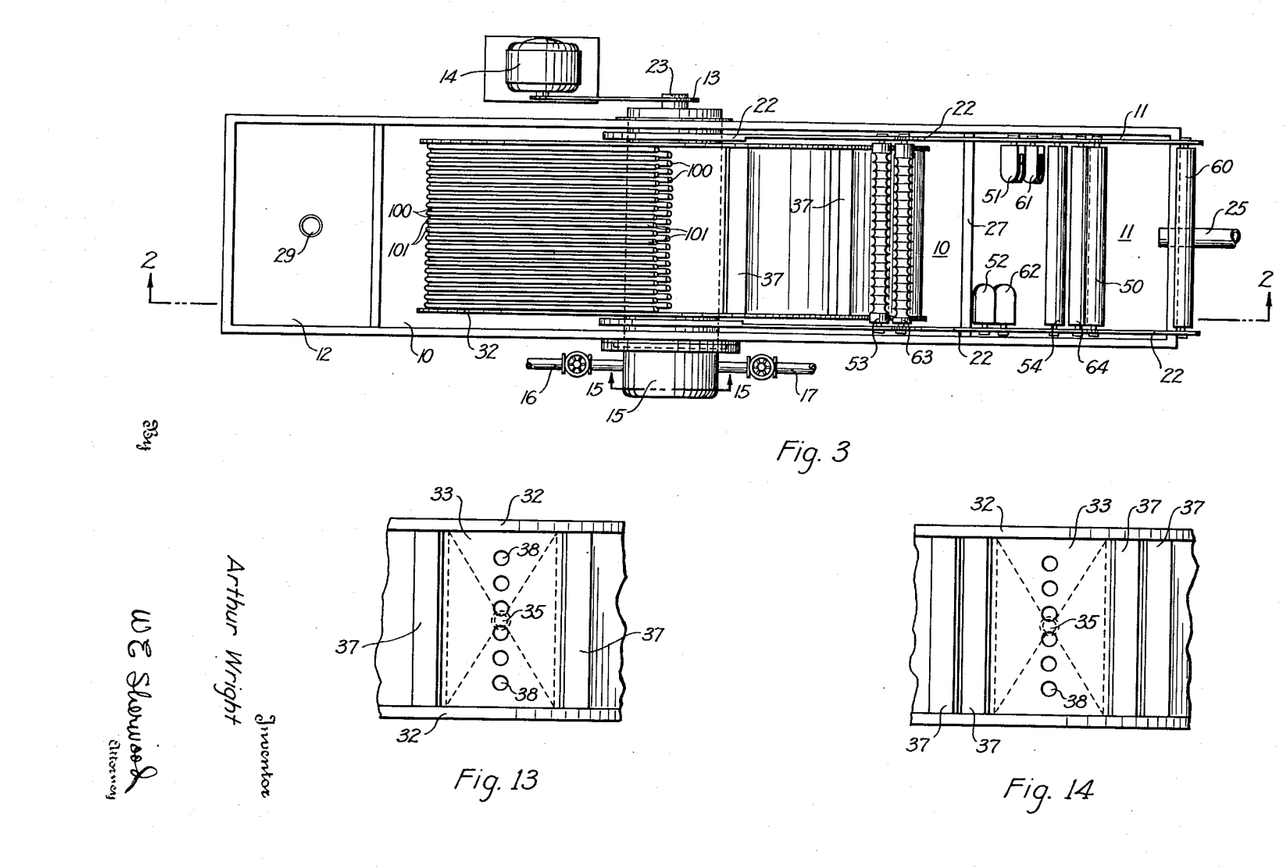
Figure 3 is a view taken on line 3—3 of Figure 2.
Figure 13 is a plan view of a filter compartment as shown in Figure 2
Figure 14 is a plan view of a modified form of filter compartment.

These characteristics of the filter unit will become more apparent when considered in connection with Figures 2 and 3 wherein the details of construction of a single unit are more clearly disclosed. As shown in Figure 2 the filter unit 20 cooperates with the tank 10 so as to rotate within the bath of filterable material held therein. For example, such material may be introduced through pipe 25 and pass into the inlet section 11 wherein it may be agitated by any suitable stirring means 26 driven from a convenient source of power. At this point it is well to note that the most efficient level of submergence of the rotary filter may be influenced by numerous factors. The present invention contemplates and is adapted for usage at varying levels of submergence as will be more clearly explained later.

It is contemplated therefore, that the agitated material flowing from inlet section 11 of the tank 10 will pass over a wall or weir 27 which may be of adjustable height and which may be varied in dependence upon the level of submergence desired by means of any suitable regulating mechanism (not shown). Similarly, it may be necessary at times to supply an excess of filterable material to the system as when a recirculation process is employed and for this reason the outlet section 12 is provided with a similar weir or wall 28 and with a drainage pipe 29.

Figures 6, 7:
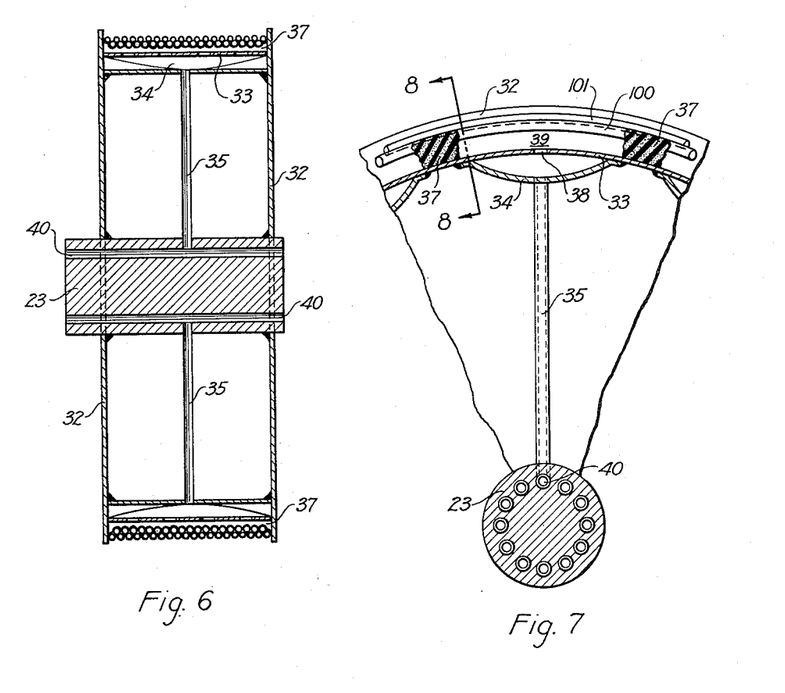
Figure 6 is a section taken on line 6—6 of Figure 2.
Figure 7 is an enlarged elevation view of a filter compartment.

Mounted upon axle or shaft 23 is a rotary drum having side walls 32 best shown in Figure 6 and having a periphery comprising a relatively thin sheet of material 33 welded or otherwise secured in air tight relation to said side walls. It will be noted at this point that the structure of the filter drum is light in weight and is fabricated from thin sheets of material thus presenting the advantages of compactness in assembly, lowered cost in manufacture and less power for driving the drum. Since the maximum pressure differential to be expected in operation of the unit is that of atmospheric air pressure, namely 15 pounds per square inch, it is apparent that light weight materials may be employed. The side walls 32 are preferably secured to axle 23 in any suitable manner and may be reinforced whenever desired in such a way as to provide adequate support for the entire drum and the filter medium and filter cake load carried thereby. Side walls 32 preferably extend an appreciable distance above the top of the filter medium and help to assist in the placement of the filter medium upon the drum as will become apparent as the description proceeds. It is desirable that side walls 32 be of such dimensions as to clear the surface of tank 10 sufficiently to permit ready movement of material therein.

Attached to the inner portion of the drum surface 33 is a plurality of individual drainage compartments or funnels having a basin portion 34 and a drainage stem portion 35. As best shown in the enlarged view of Figure 7, these unit compartments of prefabricated material may be welded to the inner portion of surface 33.

The drainage stem may then be connected in any suitable manner to a drainage outlet 40 within the axle portion 23 and leading to the outlet valve mechanism 15. As is apparent, a separate drainage outlet 40 is provided in axle 23 for each of the drainage compartments and these outlets will rotate at the same angular rate as the compartment to which it connects.

Spaced above the drum surface 33 and securely affixed to the walls 32 and the surface 33 are a plurality of bridge portions 37 preferably constructed of resilient material and serving to provide a separate drainage space upon the drum surface corresponding to the drainage compartment below said surface. Any desired number and arrangement of apertures 38 in surface 33 may be provided for joining the space 39 above the drum surface to the drainage compartment 34 beneath the surface.

Mounted upon axle 23 adjacent the exterior of walls 32 is a support bracket having spaced side walls 22 and extending a substantial distance from the filter drum. Preferably these support brackets which provide a mounting for the filter medium when not in contact with the drum are so mounted as to be rotated with respect to axle 23. In this way the entire filter medium assembly may be lifted from normal position for inspection, repair or other purposes without dismantling the unit structure. In normal position the support bracket preferably occupies the position shown in Figure 2 and may be provided with means engaging the tank portions 10 and 11 in order to insure a positive support rest during the filtering process.

It is to be noted at this point that although the support bracket is shown mounted for a horizontal movement of the filter medium and the cake carried thereby, it is easily adapted for positioning at such angles that the filter medium may move up a desired incline or down a desired incline before discharging the cake. Such variations in assembly of the improved structure are therefore to be considered within the scope of this invention.

Any suitable supporting bolts or rods not shown herein may be passed between the walls 22 of the bracket in order to insure a rigidity and strength requisite to satisfactory usage. Since relatively little strain is imposed on the bracket, the walls 22 may be rather thin and by employing a close fit upon the axle 23 adjacent the side walls 32 of the drum a compact assembly of several units, as shown in Figure 1, may be secured.

In order to appreciate the function of the bracket it may be noted at this point that the filter medium employed in this invention constitutes a radical departure over filter mediums heretofore used. Whereas prior constructions require a base of some nature fixed to the drum as a part of the filter medium, in this case no screen, cord, fabric or other such filter medium base is attached to the filter drum. On the contrary, the entire filter medium passes continually through a sequence of filtering relation with the drum, then out of filtering relation with the drum and over the support bracket and thence back into filtering relation with the drum. This moving filtering medium moreover comprises a plurality of endless cords cooperating in superimposed relation in the form of layers of continuous runs of the same cord, as will later become apparent. For convenience, the cord lying nearest the drum surface will hereinafter be called the 'primary' filter medium and the supplemental cord lying upon the primary cord and completing the filter medium will be called the 'secondary' filter medium. The use of such nomenclature is merely for purposes of disclosure, however, and no significance other than that purpose is intended to be attached thereto.

Figure 4:
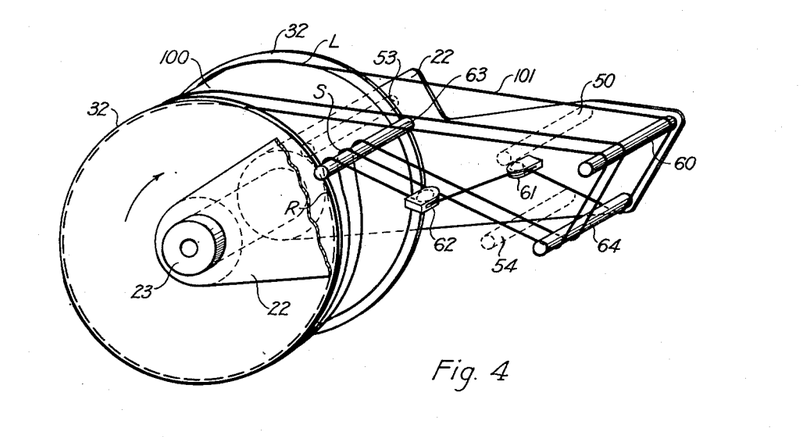
Figure 4 is a perspective view showing the path of travel of the 'secondary' a cake removal section of the filter medium.
Figure 5:
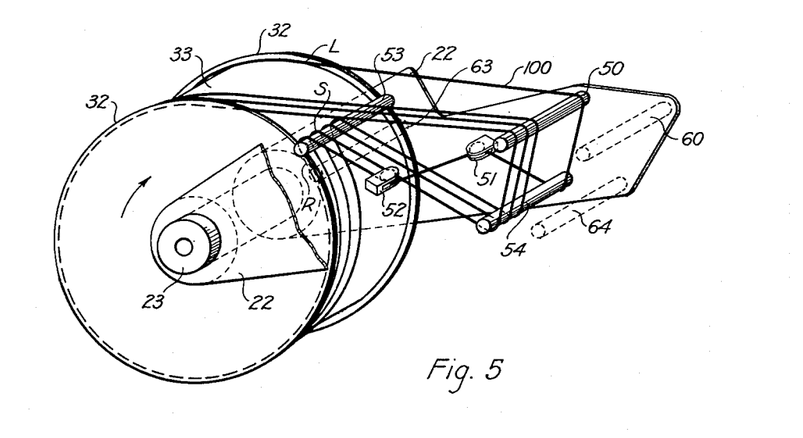
Figure 5 is a perspective view showing the 'primary' or filter base section of the filter medium.

While other figures and subsequent description will provide a more adequate disclosure of the filter medium and its advantages, reference now is had to Figures 4 and 5 wherein a schematic illustration indicates the mode of travel of the filter medium and the function of the above described support bracket.

Referring first to Figure 5 wherein the 'primary' filter medium cord is shown, it will be noted that the rotary drum is turning clockwise. A given element L of the endless cord 100 nearest the far wall 32 upon leaving the peripheral surface 33 of the drum passes tangentially therefrom and moves to a redirecting or cord-separating roll 50. It will be noted that this element of cord 100 is the left-most strand of the primary filter medium, as viewed for example from Figure 1. Upon passing over redirecting roll 50 the element L of the cord then passes downwardly over roll 54 and thence through a sheave 51 mounted upon the left wall 22 of the bracket support. From sheave 51 the given element of the cord then passes transversely of the structure and moves through a sheave 52 mounted upon the right wall 22 of the support bracket. After passing sheave 52 the direction of the cord element is changed and is directed toward primary cord aligning roll 53 having grooves therein as best shown in Figure 3. In moving over roll 53 the element of the cord under consideration is then directed into contact with the extreme right of surface 33 of the drum and becomes element R thereon. As the drum continues to rotate element R passes through a revolution in contact with the drum and in filtering relation thereto and passes tangentially from the drum surface and over roll 50 once more. After passing roll 50 the element R may then be directed to a lower roll 54 spaced at sufficient distance from rolls 50 and 53 to provide ample space for washing the filter medium whenever occasion requires.

Upon passing from roll 54 toward the aligning roll 53 element R of the cord is unable to occupy the extreme right groove in roll 54 as before, which groove now is occupied by another portion of the endless cord coming from sheave 52. Element R therefore, is directed into the second groove from the right of roll 53 and is moved into contact with the drum surface 33 once more but becomes element S or the second cord from the right wall 32 of the filter drum. In due course the element which originally was L, then R and now is S will be successively moved one space to the left upon each trip about the drum until finally it once more becomes element L of the endless primary cord 100.

Referring now to Figure 4 wherein the travel of the 'secondary' or supplemental cord 101 is shown, it is noted that this cord has the additional function of cake discharging to perform. The left-most element L of cord 101 therefore rests above the primary cord 100 of the filter medium and also has a cake deposit resting upon the top of itself. The preferred arrangement of the various rolls mounted in the support bracket as shown causes element L of cord 101 to leave the filter drum tangentially and parallel with the element L of cord 100 lying immediately therebeneath. However, as will later become apparent this relation may readily be changed whenever desired without departing from the purview of my invention. Element L of cord 101 therefore, carries its cake deposit to the distant cake discharging roll 60. Upon passing over roll 60 element L discharges the cake by gravity, or by any desired suitable cake deflector means not shown, and then passes downwardly over roll 64 and thence into sheave 61 mounted upon the left wall 22 of the support bracket. In passing through sheave 61 element L is directed transversely of the apparatus into a sheave 62 mounted upon the right wall 22 of the bracket. Hereupon the element of cord 101 being considered is directed upon the grooved secondary cord aligning roll 63 and passes into the extreme right groove of said roll.

In moving over this roll the element being considered then is directed against the right wall 32 of the drum and lies against said wall and upon the extreme right element of the cord 100 therebelow and thus changes to element R of the secondary cord of the filter medium. As the drum continues to rotate element R passes through a revolution in filtering relation to the assembly and collects a cake deposit. It then moves again tangentially from the drum and passes over cake discharging roll 60. Upon passing over roll 60 element R passes to a lower roll 64 spaced from the other rolls and is redirected back to aligning roll 63. However, since the extreme right groove in the roll is now occupied by another portion of the cord coming from sheave 62, element R is directed into the second groove from the right and when directed once again upon the primary cord 100 upon the drum then becomes element S of the secondary cord of the filter medium. In due course the element of cord 101 which originally was L, then R and now is S will be successively moved one space to the left upon each trip around the filter drum and will eventually become element L once more.

Figure 8:
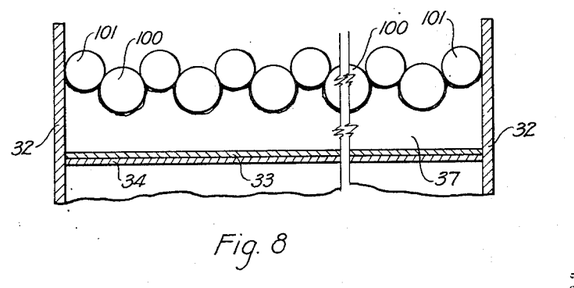
Figure 8 is a view taken on line 8—8 of Figure 7.
Figure 9:
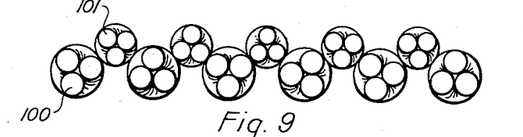
Figures 9, 10 and 11 are section views illustrating possible arrangements of the filter medium.
Figure 10:
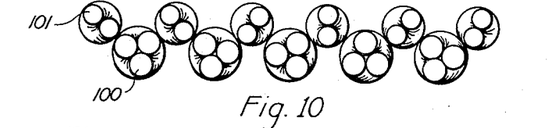
Figure 11:
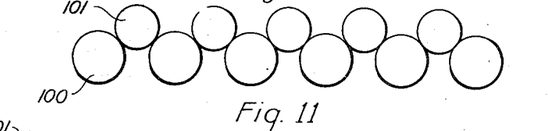
Figure 12:
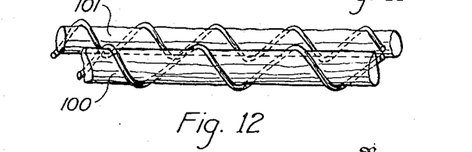
Figure 12 is an elevation view of a modified form of filter medium.

With this teaching of the travel of the respective filter medium cords in mind, reference may now be had to Figures 6, 7 and 8 which show the cooperative relation of these cords and the filter drum structure. As shown herein it is contemplated that the rotary drum will be driven from an external source of power and that the drum in turn will serve to drive or pull the filter medium over the support bracket structure. If desired, however, the filter medium could be driven from a drive roll and serve to turn the rotary drum without departing from the essentials of my invention.

As shown, the rotary drum in turning clockwise causes the filter cords coming from rolls 53 and 63 to be laid upon bridge members 37. It is contemplated that these members may be constructed of any suitable material and may either be notched in a non-resilient material to provide for accurate location of the parallel runs of the filter base cord 100 or may be made of a resilient material into which such cords would force themselves under the tension existing in the structure. In this connection while no provision for varying the tension upon the respective cords is shown, it is contemplated that any conventional means may be employed and be mounted upon the support bracket 22 whenever desired in order to maintain cords 100 and 101 at an appropriate even tension.

As the filter drum turns beneath roll 53 the parallel runs of the 'primary' or filter base cord 100 are pulled down upon the bridge means 37 immediately below roll 53 and embed themselves into the bridge 37 as shown in Figure 8. Should a non-resilient bridge having grooves therein be employed these parallel runs of cord 100 would then fit into such grooves. Likewise as the drum turns beneath roll 63 the parallel runs of the 'secondary' or cake removal cord 101 which completes the filter medium are laid above the parallel runs of cord 100 and fall within the intervening spaces of the lower cord layer. It will here be noted that cord 101 likewise is embedded against the upper portion of bridge 37 and as a consequence the tightly secured filtering bridges interposed between walls 32 and above surface 33 cooperate with the removable filter medium to enclose well defined filter compartments 39 into which air and liquid filtrate can be drawn only by passing through the cords forming the filter medium.

Figure 7 shows this relation in greater detail and as will be noted the bridges 37 when made of resilient material will be somewhat deformed to insure a close contact with the cords 100 and 101 which are under tension. In general these cords tend to form a theoretical secant of the angle formed between adjacent bridges 37 but due to the appreciable size of the structure a modified secant line results.

It is contemplated that many types of cords or filaments may be used in the practice of this invention and these may be constructed of textile threads, textile cords, wires or small metal cords woven in any desired manner. The cross section of these cords may range from a solid cylindrical shape to a shape formed from any desired number of helically wound or braided strands. Since the cords must provide a means of egress for the liquid filtrate the number or size of interstices between the cords may be widely varied depending upon the set of filter conditions being encountered. Merely as an example, I have found that a satisfactory medium result when the 'primary' or filter base cord is about $\frac{7}{32}$ inch in diameter and the 'secondary' or filter completing cord is from $\frac{4}{32}$ to $\frac{5}{32}$ inch in diameter. As will be obvious either cord 100 or cord 101 must have an uneven number of parallel runs in order to complete the filter medium and as shown in Figures 3 and 8, it is considered preferable to provide the 'secondary' cord 101 with the greater number of runs so that the extreme runs thereof may lie against the walls 32 of the drum.

For the purpose of operating the filter with thin cake deposits the invention teaches the arrangement of the respective filter cords so that the top of the filter completing cord 101 will not extend any appreciable distance above the top of the filter base cord 100. In this way the cake removal cord does not lie in the cake forming zone and does not require a substtantial depth of cake to form about the cord before it is capable of lifting said cake. Moreover, the cord 101 contacts bridge means 37 in order to establish separate vacuum compartments and in so doing will lie comparatively low between the filter base cords. As will be apparent, any desired spacing may be employed for the cords commensurate with their diameters.

Figures 9, 10, 11 and 12 illustrate different types of cords which may be employed and show respectively triple and double strand cords, solid cylindrical cords and cords having a spiral spacing filament wound therearound. This latter construction indicated in Figure 12 may comprise either a cord upon which a thread is externally wound to act as a projection or may comprise a wire pulled into the surface of the cord to provide a spiral depression therein. These cords may also be of a braided type if desired and may be impregnated on their surface with chemically resistant coatings when employed in special usages.

Regardless of the exact nature of the cords it is now obvious that my filter medium will have a number of substantially parallel interstices extending circumferentially of the filter drum and through which the liquid filtrate may pass. Furthermore, it is also apparent that transversely of the drum the filter medium will have numerous solid barriers to the flow of filtrate due to the solid cross sections of the parallel runs of the cords and that drainage will take place about the periphery of the cords rather than through the body of the filter medium.

In general the filtering art has taught the use of woven filter cloths or wire screens having drainage apertures both transversely and circumferentially of the drum for purpose of drainage through the filter medium with the result that certain inherent disadvantages have been encountered. Such filter mediums in order to operate efficiently must have a filter cake formed over the entire surface of a filter compartment. This results in large drainage volumes for the compartment and a comparatively slow building up of the cake and the consequent drainage of large volumes of cloudy filtrate containing appreciable amount of solids without provision for close control of separation of clear and cloudy filtrates. Moreover, such filter mediums may soon become clogged with solids and require frequent stoppages for cleaning. Often such filters will operate reliably only when large cake thicknesses are formed.

In contrast with this, my filter medium provides a number of substantially continuous filtrate passages extending circumferentially and so arranged as to provide a filtrate outlet lying beneath the top of the filter medium and permitting radial flow of the filtrate into said passages. It appears that these passages are capable of effective multiplication as the cake starts to form and such a cake appears to grow as a globular form from a given interstice between cords 100 and 101 until it will completely cover the exposed surfaces of those cords. This phenomenon is thought to result from the fact that the filtrate tends to pass through a passage normally to the opening therein and as such an opening is partially closed by a deposit the filtrate then passes normally to the side openings formed by that deposit. Consequently, although the superficial filtering area of this filter medium appears to be small, in reality it will be greatly enlarged as the cake growth continues. As will later become apparent, the present invention, therefore, discloses a continuous filtering process in which small drainage volumes are used, in which a rapid cake deposit is formed and in which a constantly clean filter medium is lowered into the filter bath.

As shown in Figure 2, a given filter compartment F becomes available for filtering as soon as the filter medium is positioned thereon by aligning rolls 53 and 63 and as soon as the vacuum and drainage system later to be described is connected therewith. Assuming a level of submergence above the upper bridge 37 of compartment F and with a proper connection established to the vacuum drainage system the following method of filtration would ensue. As the filter medium of compartment F passes under the surface of the filterable bath the vacuum in basin 34 immediately causes a migration of liquid and its suspended solids into the interstices between the respective runs of the filter base cord 100 and the filter completing cord 101. As basin 34 fills with liquid the larger solids become lodged in those interstices and restrict the flow of liquid and/or air therethrough. Such larger solids then tend to implement the filter medium function and begin to cause smaller solids to lodge thereon. As these lodged solids continue to grow in globular shapes the filter cake spreads out over the entire exposed surface of cords 100 and 101.

The liquid first passing into basin 34, stem 35 and passages 40 is termed 'cloudy' filtrate and may be separately disposed of as later described. As the drum continues to rotate compartment F receives less and less solids in the liquid and long before the compartment emerges from the filter bath all liquid passing therethrough is substantially free of small solids and is termed 'clear' filtrate.

As compartment F continues to rotate into the uppermost position on the drum the suction imposed thereon may be broken at an appropriate angular time and the filter medium then loses contact with the bridges 37 and moves toward the discharge roll 60. The cake formed upon said filter medium may be held in a substantially solid shape without breakage since the filter base cord 100 acts as a support therefor until that cord passes over roll 50. The cake removal section 101 of the filter medium then carries the cake over discharge roll 60 whence it may fall into any suitable conveyor or the like. By means of this arrangement no so-called 'cake reinforcement' or cake compressing means is required nor does the depth of cake have to be of an appreciable minimum size. Consequently, unit 20 may be rotated at velocities unobtainable heretofore and with filter cakes of comparatively small thickness.

In order to effect this efficient method of continuous filtration the means for application of vacuum to the filter medium and for removal of filtrate passing through that medium is important.

Figures 7, 8, 13 and 14 shows various views of a filter compartment which may appropriately be considered in connection with the drainage system. As shown in Figure 13 the sealing members 37 fit closely at their ends against walls 32 and as shown by dotted lines the filter compartment below the drum surface drains into outlet 35. Any desired number and arrangement of apertures 38 may be provided in the surface above the drain compartment.

Figure 14 illustrates a construction in which a plurality of sealing members 37 may be employed between adjacent filter compartments for insuring increased sealing of the filter medium. The tension upon cords 100 and 101 causes them to be embedded into the resilient sealing member 37 or when a non-resilient member is used will cause them to fit tightly against that member. While the enlarged view of Figure 7 shows the distortion of the upper side of the resilient sealing means and shows the filter medium resting a substantial distance above the drum surface 33, the invention is limited in no way to that exact design. When low sealing means 37 are to be used or when a substantial spacing of the sealing means is desired the filter medium may lie close to the drum surface 33 or may even rest upon that surface without detracting from efficient filtering operation. Such modifications, therefore, are to be considered within the scope of the invention.

Figure 16:
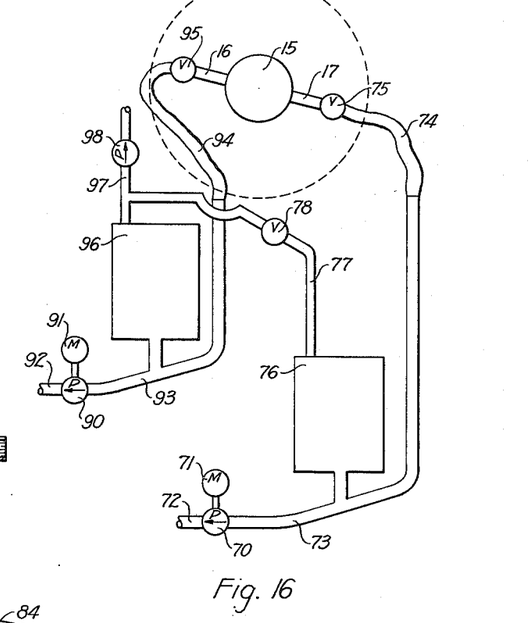
Figure 16 is a schematic view showing a vacuum drainage system suitable for carrying out the invention and Figure 17 is a schematic view showing a modified vacuum drainage system.

The coaction of the removable filter medium with the drum structure therefore produces a temporarily air tight filter chamber 39 when suction is applied from the drainage line. Referring now to Figure 16 a suitable pump means 70, such as a conventional centrifugal pump of the eductor type, may be driven by a motor 71 and may connect into a discharge line 72. A vacuum drainage line 73 may connect with the inlet of pump 70 and may join with a flexible connection 74 which in turn connects with outlet 17 of valve 15 under control of valve 75. If open communication with drainage line 73 is an elevated tank or reservoir 76 the function of which will later become apparent.

Figure 15:
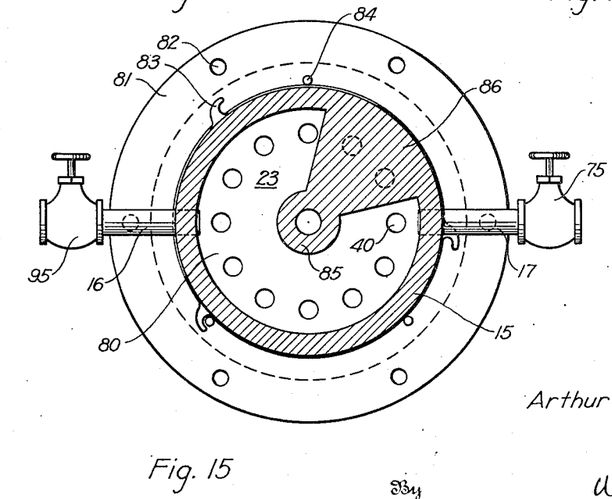
Figure 15 is a view taken on line 15—15 of Figure 3 and showing one arrangement of vacuum control valves.

As shown in Figure 15, the valve 15 contains an open space 80 and a closed solid portion 86. Extending into space 80 are the outlets 16 and 17 which are fixed to the valve housing. The open ends of drain passages 40 in drum axle 23 therefore will rotate successively across the open space 80 and closed portion 86 as the drum rotates during the filtering operation.

It is contemplated that valve 15 may be held in abutting relation against the end of axle 23 and against a boss on the wall of tank 10 by means of a clamp plate 81 fastened to the tank by bolts 82. Many variations of this construction may be employed whenever desired without departing from the invention. For example, axle 23 may be provided with a projection extending completely through the central hub 85 of valve 15 so that the filter drum could be driven from the same end to which the vacuum drainage is applied.

As later shown it is desirable that valve 15 be permitted to rotate about its fixed central axis and ears 83 rigidly fixed to the periphery of the valve body are adapted to engage with dowel pins 84 or the like, in order to provide for fixed adjustment of valve 15 in a desired radial setting.

As the compartment F shown in Figure 2 comes below the level of submergence in the tank the drain passage 40 in axle 23 corresponding to compartment F uncovers solid portion 86 of the valve 15. Pump 70 then exerts a vacuum effect which immediately is effective upon the filter cords 100 and 101 in compartment F. As liquid is drawn through the interstices of those cords and as the solids begin to deposit in a globular line along those cords the liquid filtrate then enters space 39, basin 34, stem 35, passage 40 and is withdrawn through outlet 17 in an amount corresponding to the opening of valve 75. This first filtrate may contain a certain amount of fine solids which were able to pass through the interstices of the filter medium as suction was first established and forms the so-called 'cloudy' filtrate.

As compartment F continues to revolve the filter cake is being formed and less of these solids will pass out with the liquid filtrate. As above noted one object of the present invention is its ability to insure an accurate and sensitive separation of cloudy and clear filtrates. A second outlet 16 from valve 15 is therefore provided for withdrawal of the clear filtrates. As shown in Figure 16, a second pump means 90 driven by motor 91 discharges into a drainage line 92. The inlet of pump 90 is connected to drainage line 93 which connects through the flexible conduit 94 with outlet 16 under control of valve 95. A second elevated tank 96 is in open communication with line 93 and has attached to its top a vent 97 leading to a dry vacuum pump 98 driven in any suitably controlled manner and discharging to the atmosphere. A cross connection 77 which may be controlled by valve 78 serves to connect tanks 76 and 96 when occasion requires. It is contemplated that each of the drainage systems will be constructed of large enough capacity to handle the entire drainage of filtrate and/or gaseous materials drawn through the filter medium and that either valve 75 or 95 can be completely closed if desired. However, at times a temporary condition may result in which a volume of air or the like in excess of the immediately available handling capacity of pump 70 or 90 may pass into the drainage line. At such times the large spaces of tanks 76 and 96 which are normally evacuated of gas will serve to collect this excess volume of gas. By providing the vent lines 77 and 97 these tanks may be promptly evacuated and serve to reestablish normal filtering conditions without delay. Since both tanks are constantly 'floating on the drainage line' it follows that a temporary maladjustment of a filter cord or the like can be easily remedied without interrupting the entire filtering process.

Referring now to Figures 2 and 15, as the compartment F continues to revolve in the bath the clear filtrate from that compartment passes into the open space 80 of valve 15 closer to outlet 16 than to outlet 17. Consequently, the setting of valve 75 may be adjusted so that volumetric capacity of outlet 17 is approximately that of the volume of cloudy filtrate entering space 80 adjacent the opening of outlet 17 into that space. Valve 95 on the other hand may be adjusted so that all filtrate other than that draining through outlet 17 will be compelled to pass into outlet 16. These valve adjustments may be made in inverse order, however, and in addition the outlet valve 15 may also be adjusted radially to assist in determining the proper line of demarcation between cloudy and clear filtrate.

The withdrawal of liquid filtrate and/or air may continue until compartment F revolves to the position where its passage 40 is interrupted by the solid portion 86 of the valve. In general, this is approximately the position shown in Figure 2 where the filter medium is separating from the formal sealing means 37. Due to the novel construction of this filter, it is not necessary to blow an air stream through the filter medium, nor to vent the drainage valve to atmosphere so as to break the suction effect, nor will the filter medium cords pull through the filter cake as is the case in certain prior art constructions. Since the present filter medium is unattached to the filter drum it will lift as a unit from the sealing means 37 without necessity for a special seal breaking arrangement.

Figure 17:
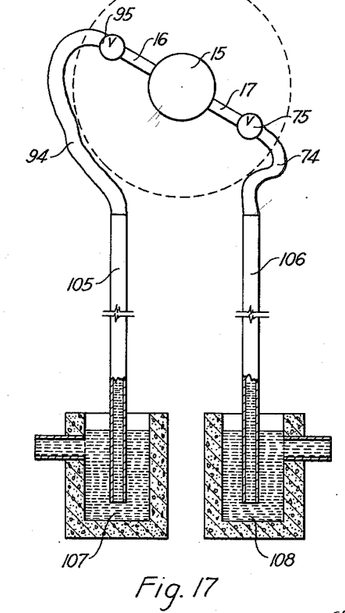

Since valve 15 is radially adjustable it is possible to adapt a standard unit to varying levels of submergence thus rendering a unit more flexible in use. As will be obvious, other variations in the drainage system may be employed and in Figure 17 one such modification is shown. Instead of using a pump drainage barometric legs 105 and 106 may be connected to the flexible conduits 94 and 74 in the valve drainage assembly above described and may terminate at a lower level in tanks 107 and 108 provided for reception of the clear and cloudy filtrates.

It will be noted that passages 40 in axle 23 shown in Figure 6 extend completely through said axles so that a number of axles may be connected together into a single shaft with a single vacuum drainage unit 15 as shown in Figure 1. However, when a single standard unit is being employed the passages 40 may be closed at one end.

Many advantages of the invention now will be more evident in view of the foregoing description. An important object is the provision of a filter medium which is constantly cleaned. It is obvious since the filter medium is not fixed to the rotary drum no dismantling of the assembly for cleaning of the drum is necessary. As shown in Figure 2, ample space for cleaning the drum surface 33 or the sealing bridges 37 or drain apertures 38 is provided between the filter medium and rolls 53 and 63. Since the filter medium cords are constantly in motion, are being transposed in position and are being cleaned of adhering threads of solids in passing over the several rolls there is no possibility of the medium becoming clogged with solids. The seating of the several runs of the cords into position on the sealing means tends to clean both the cords and the sealing surfaces. When auxiliary cleaning is desired, however, this may be obtained by spraying a cleaning medium through means 57 mounted upon support bracket 22 above rolls 54 and 64. Such cleaning medium may be caught in any suitable receptacle 58 beneath said rolls for disposition as desired. The type of cleaning medium may comprise a spray of clear wash water, or a spray of cloudy or clear filtrate or even a spray of the filterable bath itself. Ample space for mounting such washing apparatus will be found available upon the support bracket.

Having thus described the invention, I claim—

1. In combination with a rotatable filter drum having a filter compartment defined by external peripheral walls and subject to a pressure differential, a filter medium substantially covering said compartment between said walls and including a filter base section adapted to serve as a drainage member comprising an endless cord arranged in the form of a filtering layer composed of parallel runs of the endless cord and a cake removal section adapted to lie upon the filter base section comprising an endless cord arranged in the form of a cake removal layer composed of parallel runs of the endless cord, means for removing both sections of the medium from contact with the filter drum and means for removing the cake from the cake removal section of the filter medium.

2. In a filter structure, a filter drum, an endless cord arranged around said drum in the form of a layer of parallel runs of said cord, a support spaced from said drum, a first cord directing means mounted thereon and receiving one extreme lateral run of the layer of endless cord from the drum and a second cord directing means mounted thereon and receiving the cord from the first directing means and redirecting the cord to the other extreme lateral run of the layer of endless cord on said drum.

3. A method of continuously filtering liquid-borne solids comprising: feeding an inner member continuously to one end of, and moving it lengthwise through, a helical series of convolutions to form an endless inner belt and to rotate it endlessly through cake-forming and cake-stripping areas; feeding an outer member continuously to one end of, and moving it lengthwise through, another helical series of convolutions to form an endless outer belt and to rotate it endlessly through cake-forming and cake-stripping areas, both belts cooperating in the forming area to form the inner and outer faces of a liquid filtering medium; forming a cake on the outer face of the medium in said forming area; and removing the cake from the belts in said stripping area, first by separating one belt from the cake and the other belt and then by stripping the cake from the other belt.

4. The method defined in claim 3 wherein, in removing the cake, the inner belt is separated from the outer belt and cake, and then the cake is stripped from the outer belt.

5. A continuous filter comprising: a filter-medium support passing through a cake-forming filtration area; outer and inner endlessly movable belts contiguously arranged in said area respectively to form the outer and inner layers of a movable filtering medium engaging said support, each belt being composed of a series of laterally adjacent convolutions of cord, the cord of each convolution extending lengthwise through the path of belt travel; supporting means for initially directing the belts in contiguous relation, after they pass out of said area, away from said support, thereafter separating the belts in and directing them through a cake-stripping area, and finally reassembling them to reform the medium before it reenters the filtration area; means for moving the belts, and means for stripping the cake from the outer belt in the cake-stripping area.

6. The filter of claim 5 wherein: the cord convolutions of at least one belt are serially connected to extend along a helical path through which the cord moves lengthwise during belt movement; and means are provided for feeding cord to one end, and removing it from the other end, of said helical path.

7. The filter of claim 5 wherein: the cord convolutions of both belts are serially connected to extend along helical paths through which the cords move lengthwise during belt movement; and means are provided for feeding cord to one end, and removing it from the other end, of each of said helical paths.

8. The filter defined in claim 5 wherein: the filter-medium support is in the form of a rotary suction drum; and the supporting means is mounted on a normally stationary frame which is arranged for pivotal movement about the axis of drum rotation to permit the sections of the belt supported by said supporting means to be raised and lowered as a unit arcuately about said drum.

9. A continuous filter of the class described, comprising: a filter-medium support passing through a cake-forming filtration area; outer and inner endlessly movable belts, each composed of convolutions of cord, contiguously arranged in said area respectively to form outer and inner layers of a movable filtering medium engaging said support; means for forming a filter cake over the outer face of said medium during the travel of said belts through the filtration area; supporting means for directing the belts in contiguous relation, after they pass out of said area, away from said support in order to strip the cake from said support, thereafter separating the belts in order to strip the cake from the inner belt, and finally reassembling the belts on said support in advance of said filtration area to reform the medium; means for removing the cake from the outer belt when it is separated from the inner belt; and means for moving the belts.

10. The filter defined in claim 9 wherein: the cord convolutions of each belt are laterally spaced to form slots; and means are provided to wash the slot-forming convolutions of both belts after the cake has been stripped therefrom and before they are reassembled.

ARTHUR WRIGHT.